(12) United States Patent
Selestad et al.

(10) Patent No.: US 6,770,308 B2
(45) Date of Patent: Aug. 3, 2004

(54) CHEWING GUM INCLUDING ENCAPSULATED ACID MIXTURES

(75) Inventors: Donald A. Selestad, Frankfort, IL (US); Henry T. Tyrpin, Palos Park, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 10/021,625

(22) Filed: Dec. 11, 2001

(65) Prior Publication Data

US 2002/0122842 A1 Sep. 5, 2002

Related U.S. Application Data

(60) Provisional application No. 60/255,788, filed on Dec. 15, 2000.

(51) Int. Cl.⁷ .............................. A23G 3/30; A23L 1/221
(52) U.S. Cl. ............................................. 426/3; 426/650
(58) Field of Search .............................. 426/3, 5, 6, 650

(56) References Cited

U.S. PATENT DOCUMENTS

| | | |
|---|---|---|
| 3,795,744 A | 3/1974 | Ogawa et al. |
| 4,085,227 A | 4/1978 | Mackay et al. |
| 4,088,788 A | 5/1978 | Ream et al. |
| 4,151,270 A | 4/1979 | Ream et al. |
| 4,800,191 A | 1/1989 | Schally et al. |
| 4,978,537 A | 12/1990 | Song |
| 5,057,328 A * | 10/1991 | Cherukuri et al. ............. 426/5 |
| 5,108,762 A | 4/1992 | Broderick et al. |
| 5,165,944 A | 11/1992 | Song et al. |
| 5,198,251 A | 3/1993 | Song et al. |
| 5,217,735 A | 6/1993 | Zibell |

FOREIGN PATENT DOCUMENTS

| | | |
|---|---|---|
| EP | 0 146 170 A1 | 6/1985 |
| EP | 0 269 571 B1 | 6/1988 |
| EP | 0 446 170 B1 | 9/1991 |
| WO | WO 98/53705 | 12/1998 |

\* cited by examiner

*Primary Examiner*—Arthur L. Corbin
(74) *Attorney, Agent, or Firm*—Bell, Boyd & Lloyd LLC

(57) ABSTRACT

An edible acid mixture, products containing same, and methods of making same are provided. At least two acidulants are encapsulated by a polyvinyl acetate matrix. An encapsulated acid mixture is thereby produced. Preferably the acid mixture includes at least fumaric and malic acid. The mixture can be used in ingestible products including confectionery products, such as chewing gum.

12 Claims, No Drawings

CHEWING GUM INCLUDING ENCAPSULATED ACID MIXTURES

This application claims the benefit of Provisional Application No. 60/255,788, filed Dec. 15, 2000.

BACKGROUND OF THE INVENTION

The present invention generally relates to edible products. More specifically, the present invention relates to food products, including confectionery products, that include edible acids.

It is known to add food acids, edible acids, or acidulants as they are known, to food products. These acidulants are used to provide a pleasant, refreshing, acidic taste to foods, drinks, confectionery products and beverages. If desired, they can also serve as a preservative by lowering the pH of the foodstuff to which they are added thereby reducing the activity of possibly harmful microorganisms. An example of such a food acid is citric acid.

Typically, the acid taste profile of a food acid can be described as a rapid burst of tartness. Usually, food acids reach their peak acid taste fairly early, with the taste falling off and disappearing quite rapidly thereafter. The rapid burst can create issues as the strong acid taste tends to overpower the flavor of sweeteners and flavorants in the foodstuff to which the food acid has been added. The relatively rapid loss of tartness also can result in a bitter aftertaste if certain synthetic high-intensity sweeteners are used in the foodstuff in conjunction with the food acid. Not only do food acids suffer disadvantages in view of their strong sharp taste and short-lived tartness flavor, they can suffer some additional disadvantages. These disadvantages may impair their use in certain manufacturing processes.

It is known to use food acids in confectionery products such as chewing gum and other chewable candies to provide a tartness or sour taste to the product. Numerous attempts have been made to extend the tartness of food acids in confectionery products and other foods. Such attempts include trying to encapsulate the food acids. However, many of these acids destroy the encapsulant matrices that have been used.

With respect to chewing gum compositions, food grade acids have been added to same in order to achieve, for example, a sourness effect. Particularly citrus fruit flavors have been added to chewing gum. Generally, the acids are added directly to the water-soluble gum portion of the chewing gum to ensure the release of the acid during the chew. See, for example, U.S. Pat. Nos. 4,088,788 and 4,151,270. U.S. Pat. No. 4,085,227 also discloses the addition of food acids directly in their free form to a chewing gum composition. In the patent, food acids are added to the gum base portion of the chewing gum composition. U.S. Pat. No. 4,800,191 also discloses the addition of free acids to a chewing gum composition.

It is known in the food science art to encapsulate certain products that are added to food products. U.S. Pat. No. 3,795,744 discloses various seasonings that are coated or encapsulated. It is also known to encapsulate food grade acids in chewing gum. EP 0446170 discloses a food acid delivery system that effects a controlled release of an acid.

Despite the various attempts to provide food products including food grade acids, there is a need for an improved method and food products including food grade acid having an extended period of tartness perception, increased salivation, and overall enjoyment of the food products.

SUMMARY OF THE INVENTION

The present invention provides improved food acid mixtures. Moreover, the present invention provides improved consumables such as confectionery products, e.g., chewing gums, including food acid mixtures. Additionally, the present invention provides improved methods for making food products including edible acids. Although in the preferred embodiment set forth in detail below, the present invention relates to confectionery products and specifically chewing gums, the present invention can be utilized to produce a variety of edible products, including foodstuffs, nutrients, pharmaceuticals, nutraceuticals, confectionery products including chewing gum and chewable candies, and other products that are designed to be ingested by a consumer.

In an embodiment, the present invention provides a chewing gum comprising a water-soluble portion, a water-insoluble portion, and an encapsulated acid mixture comprising a mixture of at least two acidulants that are encapsulated in polyvinylacetate.

In an embodiment, the mixture of acidulants includes at least one acid selected from the group consisting of fumaric, malic, and tartaric acid.

In an embodiment, the mixture of acidulants comprises approximately 0.1 to about 10% by weight of the chewing gum.

In an embodiment, the mixture of acidulants comprises 10% to about 40% by weight of the encapsulated acid mixture.

In an embodiment, the mixture of acidulants comprises, by total weight percent: approximately 25% to about 65% fumaric acid; approximately 10% to about 50% malic acid; and approximately 0% to about 25% tartaric acid.

In an embodiment, the polyvinyl acetate has a molecular weight range of 20,000 to about 120,000.

In another embodiment of the present invention, a confectionery product is provided comprising an acid mixture including at least fumaric acid and malic acid encapsulated by a coating of a hydrophobic polymer.

In an embodiment, the acid mixture comprises, by total weight percent: approximately 25% to about 65% fumaric acid; approximately 10% to about 50% malic acid; and approximately 0% to about 25% tartaric acid.

In an embodiment, the acid mixture comprises approximately 10% to about 40% by weight of the encapsulated acid mixture.

In an embodiment, the confectionery product is a chewing gum product.

In yet another embodiment of the present invention, an acid mixture is provided comprising: at least one particle of a mixture of acidulants including fumaric and malic acid, and polyvinyl acetate encapsulating the particle.

In a still further embodiment of the present invention, a method of producing an edible product including an acidulant is provided comprising encapsulating at least fumaric and malic acid in a hydrophobic polymer.

In an embodiment, the method includes the step of adding the encapsulated acidulant to a chewing gum.

In an embodiment, the method includes the step of preparing particles that include the acidulant and coating the particles with the hydrophobic polymer. In a further embodiment, the particles are coated by being extruded with the hydrophobic polymer.

It is an advantage of the present invention to provide improved food products including an edible acid.

Another advantage of the present invention is to provide improved confectionery products.

Moreover, an advantage of the present invention is to provide improved chewing gum products.

Still further, an advantage of the present invention is to provide improved products including food acids that can be added to products that are designed to be consumed.

Further, an advantage of the present invention is to provide improved methods for making food products including a food acid.

Furthermore, an advantage of the present invention is to provide confectionery products including a food acid that has prolonged tartness and salivation characteristics.

Another advantage of the present invention is to provide food acids in a food product that have an improved acid taste profile.

Still, an advantage of the present invention is to provide a food acid delivery system for delayed or prolonged release of tartness from the food acids.

Additional features and advantages of the present invention will be described in and apparent from the detailed description of the presently preferred embodiments.

DETAILED DESCRIPTION OF THE PRESENTLY PREFERRED EMBODIMENTS

The present invention provides improved food acid mixtures, products containing same, and methods of manufacturing such products.

To this end, the present invention provides encapsulated acidulants. By encapsulating the acidulants, it has been found that one is able to extend or delay the release of acids. Further, the encapsulated acidulants are in a form that is suitable for incorporation in food products such as confectionery products, e.g., chewing gum. The encapsulated acidulants produced by the present invention reduce degradation of the encapsulated material during extrusion, resulting in longer lasting tartness and/or longer lasting flavor in food products containing same.

Pursuant to the present invention, the acidulants are coated by polyvinyl acetate. It has been found that the coating of polyvinyl acetate on the acid mixture provides a material that will not degrade during processing. Moreover, when added to a confectionery product, such as chewing gum, the encapsulated acid mixture provides a longer lasting tartness duration. Because the polyvinyl acetate coating is substantially water insoluble, it protects the food acid from hydrolytic degradation and/or neutralization. Yet, when chewed, the acid core material will slowly be released from the polyvinyl acetate into the oral cavity.

Pursuant to the present invention, the composite acid mixture is in the form of a particle. In an embodiment, generally, the particle is prepared by first making a slurry including a slow release edible acid that has low water solubility, e.g., fumaric acid, and mixing it with an aqueous acid solution of edible acids having high water solubilities, e.g., malic and tartaric acids. The slurry is then granulated and dried.

The encapsulated composite acid matrix is generally prepared by blending ground polyvinyl acetate and the powder composite acid and adding them together into an extruder. The outer layer components are maintained at a temperature of approximately 200° F. The resultant mixture after existing the extruder is cooled to about 32° F. The solid mixture of this invention can then be milled or ground into a powder or granulated form.

It has been found that particle size is not critical to the delivery system. Accordingly, the size of the particles can be adjusted to accommodate a particular desired release rate and mouth feel, depending on the vehicle, e.g., chewing gum compositions, pharmaceutical preparations, denture products, confection and the like, in which it is incorporated.

The food acids, also commonly known as acidulants in the food industry, may be present in amounts of approximately 0.1% to about 10% by weight of the total chewing gum composition. Acidulants may also be present in amounts of approximately 0.5% to about 7.5% or, in an embodiment, approximately 1% to about 2.5% by weight of the total chewing gum composition. With respect to their presence in the encapsulant, the acids are present in amounts of approximately 10% to about 40%, by weight or, in an embodiment, approximately 20% to about 30%, and in a further embodiment, about 25% of the complete encapsulation system.

The particular amount of acids present and the type of acids used in the composite acid mixture should be balanced in order to achieve a stable encapsulant as well as attaining the desired amount of tartness. Too much or too little of any of the participating acids can challenge the integrity of the encapsulating matrix. This may not achieve the effect of extended tartness and pleasant taste. Preferably, the acid mixture includes at least two acidulants. The acidulants can be selected from the group consisting of fumaric acid, malic acid, tartaric acid, citric acid, lactic acid, ascorbic acid, or mixtures of same. Preferably the composite acid form comprises fumaric acid in an amount of approximately 25% to about 65%, malic acid in an amount of approximately 10% to about 50% and tartaric acid in an amount of approximately 0% to about 25%, all by weight percent of the total acid. The fumaric acid may be cold water soluble fumaric acid. Generally, cold water soluble fumaric acid refers to finely ground fumaric acid that includes a small amount of a wetting agent.

In a preferred embodiment the encapsulated acidulant is an acid composite as set forth in PCT WO 98/53705, the disclosure of which is incorporated herein by reference.

The polyvinyl acetate (PVAc) coatings of the present invention result in an improved sustained release of food acids to the sensory system. Preferably the PVAc used for encapsulation has a medium range molecular weight of approximately 20,000 to about 50,000 or, in an embodiment, approximately 30,000 to about 40,000. Low molecular weight PVAc having a range of approximately 15,000 to about 25,000 or a high molecular weight PVAc having a range of approximately 50,000 to about 80,000 may also be used. Very high molecular weight PVAc having a range of approximately 80,000 to 120,000 may also give extended release of acids. It is believed that lower molecular weight PVAc provides faster release, whereas higher molecular weight PVAc would extend acid release.

In an embodiment of the invention, a chewing gum having extended acid release is provided. The chewing gum comprises a chewing gum base and an extended release acid composition that comprises a composite acid mixture encapsulated by a coating material of a hydrophobic polymer. The polymer is characterized by: (a) being water insoluble; (b) having form filming capability; and (c) being compatible with the composite acid mixture, wherein the amount of coating material to composite acid mixture is from approximately 55% to about 85% by weight.

The present invention, it is believed, can be used with a variety of processes for manufacturing chewing gum. It may also be used for sugar gum, sugarless gum and bubble gum.

Chewing gum products of the present invention may be and include a variety of different compositions that are typically used in chewing gum compositions. In general, a chewing gum composition typically contains a chewable gum base portion which is essentially free of water and is water soluble, a water soluble bulk portion and flavors which are typically water insoluble.

The water soluble portion dissipates with a portion of the flavor over a period of time during chewing. The gum base portion is retained in the mouth throughout the chew. The gum base portion is retained in the mouth throughout the chew. The insoluble gum base generally comprises elastomers, elastomer solvents, plasticizers, waxes, emulsifiers, and inorganic fillers. Plastic polymers such as polyvinyl acetate, which behave somewhat as plasticizers, are also included. Other plastic polymers that may be used include polyvinyl laurate, polyvinyl alcohol, and polyvinyl pyrrolidone.

Elastomers may include polyisobutylene, butyl rubber, isobutylene-isoprene copolymer, and styrene butadiene rubber, as well as natural latexes such as chicle. Elastomer solvents are often resins such as terpene resins. Plasticizers, sometimes referred to as softeners, are typically fats and oils, including tallow, hydrogenated vegetable oils, and cocoa butter. Commonly employed waxes include paraffin, microcrystalline waxes, especially those with a high degree of crystallinity, may be considered bodying agents or texture modifiers.

Gum base typically also includes a filler component. The filler component may be calcium carbonate, magnesium carbonate, talc, dicalcium phosphate or the like. The filler may constitute between approximately 5% to about 50% of the gum base.

Emulsifiers, which sometimes also have plasticizing properties, include glycerol monosterate, lecithin, and glycerol triacetate. Further, gum bases may also contain optional ingredients such as antioxidants, colors, and flavors.

The insoluble gum base may constitute between approximately 5% to about 95% of the gum. Typically, the insoluble gum base may comprise between approximately 10% and 50% of the gum, or from approximately 20% to about 40% of the gum. The water soluble portion of the chewing gum may further comprise softeners, sweeteners, flavoring agents, and combinations thereof. The sweeteners often fulfill the role of bulking agents in the gum. The bulking agents typically comprise approximately 5% to about 95% of the gum composition.

Softeners are added to the chewing gum in order to optimize the chewability and mouth feel of the gum. Softeners, also known in the art as plasticizers or plasticizing agents, generally constitute between approximately 0.5% to about 15% of the chewing gum. Softeners contemplated by the present invention include, for example, lecithin. Further, aqueous sweetener solutions such as those containing sorbitol, hydrogenated starch hydrolysate, corn syrup, and combinations thereof may be used as softeners and binding agents in the gum.

In an embodiment, the gum formulation of the present invention is a sugar-free gum formulation. However, sugar-gum formulations also may be manufactured pursuant to the present invention. Sugar sweeteners generally include saccharide-containing components commonly known in the chewing gum art which comprise, but are not limited to, sucrose, fructose, levulose, galactose, corn syrup solids and the like, alone or in any combination. Generally, sugarless sweeteners include components with sweetening characteristics, but which are devoid of the commonly know sugars. Such sugarless sweeteners are sorbitol, mannitol, xylitol, hydrogenated isomaltulose, maltitol, erythritol, and the like, alone or in any combination.

Depending on the particular sweetness release profile and shelf stability required, coated or uncoated high intensity sweeteners may be used in chewing gum composition. High intensity sweeteners, such as aspartame, may be used at levels from approximately 0.01% to about 3.0%. Encapsulated aspartame is a high intensity sweetener with improved stability and release characteristics, as compared to free aspartame. Free aspartame can also be added, and a combination of some free and encapsulated aspartame can be used.

Combinations of sugar and sugarless sweeteners may be used in chewing gum. Additionally, the softener may also provide additional sweetness such as with aqueous sugar or alditol solutions.

Flavors may be present in the chewing gum in an amount within the range from approximately 0.1% to about 10% and typically from approximately 0.5% to about 3.0% of the gum. Flavors contemplated by the present invention include any liquid flavoring that is of food acceptable quality. The flavor may comprise essential oils, synthetic flavors, or mixtures thereof, including but not limited to, oils derived from plants and fruits such as citrus oils, fruit essences, peppermint oil, spearmint oil, clove oil of wintergreen, anise and the like. Artificial flavoring components are also contemplated by the present invention. Those of ordinary skill in the art will recognize that natural and artificial flavors may be combined in any sensorally acceptable blend. All such flavors and blenders are contemplated by the present invention.

Optional ingredients such as colors, emulsifiers, and pharmaceutical agents may also be added as separate components of the chewing gum composition, or added as part of the gum base.

A method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casing into pellets.

Generally, the ingredients are mixed by first melting the gum base and adding it to the running mixer. The base may also be melted into the mixer itself. Colors or emulsifiers may also be added at this time. A softener may be added to the mixer at this time, along with syrup and a portion of the bulking agent. Further parts of the bulking agent are then added to the mixer. Flavoring agents are typically added with the final portion of the bulking agent. Other optional ingredients are added in the batch in a typical fashion, well known to those of ordinary skill in the art.

The entire mixing procedure typically takes from five to fifteen minutes, but longer mixing times may sometimes be required. Those skilled in the art will recognize that many variations of the above-described procedure may be follows.

After the ingredients are mixed, the gum mass may be formed into a variety of shapes and products. For example, the ingredients may be formed into pellets or balls and used as cores to make a coated chewing gum product. However, any type of chewing gum product can be utilized with the present invention.

If a coated product is desired, the coating may contain ingredients such as flavoring agents, artificial sweeteners and dispersing agents, coloring agents, film formers and binding agents. Flavoring agents contemplated by the present invention, include those commonly known in the art such as essential oils, synthetic flavors, or mixtures thereof, including but are not limited to, oils derived from plants and fruits such as citrus oils, fruit essences, peppermint oil, spearmint oil, other mint oils, clove oil, oil of wintergreen, anise and the like. The flavoring agents may also be added to the coating syrup in an amount such that the coating will contain from approximately 0.2% to about 1.2% flavoring agent, and typically constitute from approximately 0.7% to about 1.0% flavoring agent.

Artificial sweeteners, particularly high intensity sweeteners, contemplated for use in the coating include, but are not limited to, synthetic substances, saccharin, thaumatin, alitame, saccharin salts, aspartame, sucralose, and acesulfame K. The artificial sweetener may be added to the coating syrup in an amount such that coating will contain from approximately 0.05% to about 1.0% and typically from approximately 0.10% to about 0.5%, artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. The dispersing agent may be added to the coating syrup in an amount such that the coating syrup in an amount such that the coating will contain approximately 0.1% to about 1.0% and typically from approximately 0.3% to about 0.6% of the agent.

Coloring agents may be added directly to the coating syrup in dye or lake form. Coloring agents contemplated by the present invention include food quality dyes. Film formers may be added to the coating syrup include methylcellulose, carboxymethyl cellulose, ethyl cellulose, hydroxyethyl cellulose, and the like or combinations thereof Binding agents may be added either as an initial coating on the chewing gum center or may be added directly to the coating syrup. Binding agents contemplated by the present invention include gum arabic, gum talha, gelatin, vegetable gums, and the like. The binding agents, when added to the coating syrup, are typically added at a level of between approximately 0.5% to about 10%.

By way of example and not limitation, an example of the food grade composite acid mixture is as follows:

Example No. 1

The following food grade ingredients are added to a mixing vessel fitted with an agitator at the rates indicated, and mixed:

| | |
|---|---|
| Tartaric Acid | 50 kg/hour |
| Malic Acid | 500 kg/hour |
| Fumaric Acid | 450 kg/hour |
| dioctyl suLphosuccinate wetting agent (70%) | 2.25 kg/hour |
| Silicone oil anti-foaming | 15 g/hour |
| Water | 500 l/hour |

The mixing vessel has a capacity of about 1500 l and is sufficiently large to allow adequate mixing and time for the soluble ingredients to dissolve. Only the fumaric acid does not dissolve, so that a slurry is formed.

The slurry is fed continuously into a wet mill in which it is milled. The milled slurry is then pumped directly under pressure into a continuous drier/granulator unit using a positive displacement pump where granulation and initial drying of most of the moisture (down to about 1% residual) takes place in a fluidized bed in the first stage of the unit. The first stage comprises a round generally squat vessel, into which the slurry is pumped continuously under pressure through a nozzle into a fluid bed. This process is carried out optionally with or without atomizing compressed air. The bed is fluidized with hot air at about 65° C. at superficial velocities used in fixed fluid beds, which are typically in the range of 0.3–2.4 m/s.

The height of the bed is controlled by the volume and pressure of the air entering the chamber from under the screen. The volume and residence time of the product in the fluid bed is maintained at set conditions by allowing a certain quantity to exit the bed through a rotary outlet valve, and enter a second stage. The outlet air from the first chamber is passed from the top of the vessel through a cyclone to remove entrained product fines which were returned to the fluidized bed where they came into contact with the inlet spray and other particles in the bed.

The second stage consists of a mechanically vibrated rectangular fluid bed where product is moved forward by air flows and where additional drying and subsequent cooling takes place. Both the hot and cold air streams are collected with the fines that are removed by the cyclone and again returned to the fluid bed of the first chamber. Additional additives such as flavorants, colorants and/or sweeteners are optionally incorporated by spraying the additive on to the granules in the second stage.

The dried and cooled product from the second stage, having a low residual moisture content of typically less than 0.3% is placed onto a screen where oversize particles are removed and ground up before being returned to the fluid bed of the first stage, together with the undersize fines which were screened out. The screening machine controls the final particle size of the product, while extraction ducts from the top of the second stage unit further classified the product by drawing off fines and dust which was removed from the air stream by the cyclone and returned to the fluid bed of the first stage granulator. Through this method the composite acid particles can be produced. A sample of composite acid was obtained and used in Example A and 3.

Example No. 2

A quantity of another composite acid was obtained from NCP Food Ingredients, a division of Keltron and Pettibone, Inc. of South Africa. This composite acid mixture was 50% malic acid, 41% fumaric acid, and 9% tartaric acid. It was made similar to Example 1 and used as the composite acid in Examples 4 and 5.

By way of example, and not limitation, examples of the present invention and comparative products are set forth below as well as sensory testing of some of the examples:

Gum Examples

Encapsulated Example 1 was made by blending 25% composite acid with 75% medium MW PVAc to make 1 kg, and adding the blend to an extruder. The blend was extruded in a Clextral BC-21 twin screw extruder at 100° C. until a quantity of encapsulated acid was obtained. No degradation of the PVAc coating was observed. The encapsulated acid was then ground to the following particle size:

| | |
|---|---|
| Retained on 40-mesh | 1% |
| Retained on 60-mesh | 10% |
| Retained on 80-mesh | 13% |
| Retained on 100 mesh | 10% |
| Retained on 200-mesh | 32% |
| Through 200-mesh | 34% |

This material was then used in a bubble gum composition set forth in Example 3. Sensory analysis comparing Example 3 to Example A showed a higher level of tartness after four minutes and lasting up to 12 minutes. Thus, the encapsulation of composite acid gave longer lasting tartness.

TABLE 1

(% by weight)

|  | Example A | Example 3 | Example B | Example 4 |
|---|---|---|---|---|
| Gum Base | 29.4 | 28.6 | 29.4 | 26.1 |
| Sorbitol | 53.1 | 51.8 | 53.1 | 50.0 |
| Glycerin | 11.2 | 10.9 | 11.2 | 10.9 |
| Water | 0.7 | 0.7 | 0.7 | 0.7 |
| Encapsulated Sweetener | 0.2 | 0.2 | 0.2 | 0.2 |
| Lecithin | 0.45 | 0.45 | 0.45 | 0.45 |
| Sweetener | 0.1 | 0.1 | 0.1 | 0.1 |
| Flavor | 3.0 | 3.0 | 3.0 | 2.4 |
| Color | 0.15 | 0.15 | 0.15 | 0.15 |
| Composite Acid | 1.7 | 1.6 | 1.7* | 2.0 |
| Encapsulated Composite Acid | — | 2.5 | — | 7.0 |
| Total | 100.0 | 100.0 | 100.0 | 100.0 |

*Physical mixtures of 40% fumaric, acid, 35% citric, and 25% adipic acid

In Comparative Example B, the composite acid was a mixture of 40% fumaric acid, 35% citric acid, and 25% adipic acid. This blend has been previously used in standard bubble gum type formulations.

Sensory evaluation of Comparative Example B compared to Example 4 by a panel showed that not only was there a significant increase in the level of tartness in Example 4, but the increased level of tartness remained for the entire 12 minutes of chewing.

Preparation of Example 2 of the encapsulated composite acid was scaled up using 150 pounds of composite acid and 450 pounds of medium MW PVAc. The mixture was dry blended and added to a Teledyne compounder with Zone 1 and 2 temperatures set at 200° F. and feed rate at 280 pounds per hour. The extrudate exiting the compounder was at a temperature of about 175° F. and very sticky in the cooling tunnel. Temperature exiting the cooling tunnel was about 80–85° F. About 100 pounds of product was obtained. After several milling tests, the final product was ground to give a product with the following particle size:

| Retained on 40-mesh | 0.0% |
|---|---|
| Retained on 100-mesh | 37.7% |
| Retained on 200-mesh | 33.1% |
| Retained on 325 mesh | 20.4% |
| Through 325-mesh | 8.8% |

This material was used in the above gum composition of Example 4 and in the gum composition of Example 5 shown below:

| Base | 25.40% |
|---|---|
| Sorbitol | 49.80% |
| Glycerin | 11.20% |
| Flavor | 3.00% |
| Water | 0.70% |
| Vegetable Oil | 0.50% |
| Lecithin | 0.45% |
| Encapsulated APM | 0.20% |
| APM | 0.10% |
| Color | 0.15% |
| Composite Acid | 1.70% |
| Encapsulated Composite Acid | 6.80% |
| | 100.00% |

This formula was consumer tested against Comparative Example B and showed consumers significantly rated Example 5 to have longer lasting taste, longer lasting tartness, better sweetness, better tartness, and better overall flavor. Data showed significant differences in the level of tartness were noted up to 20 minutes of chewing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

We claim:

1. A chewing gum comprising:
   a water-soluble portion;
   a water-insoluble portion;
   an encapsulated acid mixture consisting essentially of a mixture of at least two acidulants encapsulated in polyvinylacetate.

2. The chewing gum of claim 1 wherein the acidulants include at least one acid selected from the group consisting of fumaric, malic, and tartaric acid.

3. The chewing gum of claim 1 wherein the mixture of acidulants comprises approximately 0.1% to about 10% by weight of the chewing gum.

4. The chewing gum of claim 1 wherein the mixture of acidulants comprises approximately 10% to about 40% by weight of the encapsulated acid mixture.

5. The chewing gum of claim 1 wherein the mixture of acidulants comprises, by total weight percent:
   approximately 25% to about 65% fumaric acid;
   approximately 10% to about 50% malic acid; and
   approximately 0% to about 25% tartaric acid.

6. The chewing gum of claim 1 wherein the mixture of acidulants comprises, by total weight percent:
   approximately 50% malic acid;
   approximately 41 % fumaric acid; and
   approximately 9% tartaric acid.

7. The chewing gum of claim 1 wherein the polyvinyl acetate has a molecular weight range of approximately 20,000 to about 120,000.

8. The chewing gum of claim 1 wherein the chewing gum is sugarless.

9. The chewing gum of claim 1 wherein the mixture includes a dry composite acid.

10. A method of producing an edible product including an acidulant comprising encapsulating acidulants including at least fumaric and malic acid in an encapsulating material consisting essentially of a hydrophobic polymer to produce an encapsulated acidulant.

11. The method of claim 10 including the step of adding the encapsulated acidulant to a chewing gum.

12. The method of claim 10 wherein the edible product is chewing gum.

* * * * *